United States Patent
Lovato et al.

(10) Patent No.: US 7,208,888 B2
(45) Date of Patent: Apr. 24, 2007

(54) LIGHT-EMITTING DIODE LIGHTING DEVICE COMPRISING A COMMUNICATION DEVICE AND INSTALLATION COMPRISING ONE SUCH DEVICE

(75) Inventors: Jean-Louis Lovato, Biviers (FR); Vincent Minier, Claix (FR); Virginie Collomb, Grenoble (FR); Roland Moussanet, Notre dame de Commiers (FR); Michel Barrault, Mens (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 55 days.

(21) Appl. No.: 10/535,992

(22) PCT Filed: Nov. 20, 2003

(86) PCT No.: PCT/FR03/03433

§ 371 (c)(1),
(2), (4) Date: May 25, 2005

(87) PCT Pub. No.: WO2004/062141

PCT Pub. Date: Jul. 22, 2004

(65) Prior Publication Data

US 2006/0071613 A1   Apr. 6, 2006

(30) Foreign Application Priority Data

Dec. 5, 2002   (FR) .................................. 02 15359

(51) Int. Cl.
*G05F 1/00*   (2006.01)
*G01J 1/32*   (2006.01)

(52) U.S. Cl. ...................... 315/308; 250/205
(58) Field of Classification Search ................ 315/291, 315/307, 308, 302; 359/723, 889; 362/293; 250/205
See application file for complete search history.

(56) References Cited

U.S. PATENT DOCUMENTS

| | | | | |
|---|---|---|---|---|
| 4,516,221 | A | 5/1985 | Nakata et al. | 364/900 |
| 5,995,253 | A | 11/1999 | Flaherty | 359/110 |
| 6,084,250 | A | 7/2000 | Justel et al. | 257/89 |
| 6,411,046 | B1 * | 6/2002 | Muthu | 315/309 |
| 6,576,881 | B2 * | 6/2003 | Muthu et al. | 250/205 |
| 6,791,259 | B1 * | 9/2004 | Stokes et al. | 313/503 |
| 7,038,399 | B2 * | 5/2006 | Lys et al. | 315/291 |
| 2002/0047624 | A1 | 4/2002 | Stam et al. | 315/291 |
| 2002/0048177 | A1 * | 4/2002 | Rahm et al. | 362/555 |
| 2002/0167701 | A1 | 11/2002 | Hirata | 359/172 |
| 2004/0195975 | A1 * | 10/2004 | Fregoso | 315/219 |

FOREIGN PATENT DOCUMENTS

| | | |
|---|---|---|
| EP | 0 921 515 | 6/1999 |
| WO | WO 01/35552 | 5/2001 |

* cited by examiner

*Primary Examiner*—Thuy Vinh Tran
(74) *Attorney, Agent, or Firm*—Steptoe & Johnson LLP (57) ABSTRACT

The lighting device comprises at least one emitter (10) of white light (9) produced by an initial radiation (1) and a secondary radiation (2), an electronic control circuit (11) to control the lighting, and a communication circuit (12). The electronic circuit (11) controls power supply of the light emitter to emit a modulating light signal (3, 4, 31, 36) of said initial radiation according to a communication signal (13). Said modulating light signal is designed to be received by a light signal receiver (18) sensitive to the initial radiation (1). A lighting installation comprises a power supply line, at least one lighting device (8) and at least one electrical apparatus (95, 96) connected to a receiver (18) comprising a sensor (19) sensitive to the initial radiation (1).

14 Claims, 7 Drawing Sheets

LIGHT-EMITTING DIODE LIGHTING DEVICE COMPRISING A COMMUNICATION DEVICE AND INSTALLATION COMPRISING ONE SUCH DEVICE

This application is a National Phase Application under 35 U.S.C. 371 claiming the benefit of PCT/FR2003/003,433 filed on Nov. 20, 2003, which has priority based on France Application No. 02/15,359 filed on 12/05/2002

BACKGROUND OF THE INVENTION

The invention relates to a lighting device comprising at least one light-emitting diode light emitter designed to emit white light by producing an initial radiation and a secondary radiation resulting from excitation of at least one layer of material reacting to said initial radiation, electronic control means connected to said at least one light-emitting-diode light emitter to control the lighting, and at least first communication means connected to said control means. The invention also relates to a lighting installation comprising an electric power supply line to supply at least one such device.

State of the Art

Known lighting devices comprising a communication device use light-emitting diodes to emit luminous communication signals.

Such devices are described in particular in U.S. patent application Ser. No. 2002/0,048,177. These devices are used with information display or indication devices in association with sound or visual type receivers.

However, known devices can not be applied for good quality lighting. These lighting devices with colored diodes do not in fact enable a good color rendering to be achieved. Moreover, superposition of communication signals is liable to impair the quality of the light and to make changes of color and intensity visible.

In light-emitting diode lighting devices emitting white light, the diodes emit a first light radiation the color whereof is towards the blues or the ultraviolet. The first radiation excites in particular a layer of phosphors or other fluorescent materials, which layer emits a second radiation in colors of higher wavelength in the visible, for example towards yellow or green. Mixing of the first and second radiation thereby gives a white light of good quality to be used for lighting.

However, control of light-emitting diodes emitting white light to transmit communication signals at the same time as emitting the light for lighting gives rise to problems of light quality and of transmission rate. The fluorescence of the phosphors in fact has too great a response time to enable transmission of signals of more than 1 megabit per second. In addition, even with lower speeds, modulation of the first radiation modifies the white color resulting from mixing of the first and second radiations.

SUMMARY OF THE INVENTION

The object of the invention is to provide a lighting device comprising a communication device enabling a high transmission rate and/or a good quality white light emission, and also an installation equipped with such a device.

In a device according to the invention, the electronic control means control power supply of at least one light-emitting diode light emitter to emit a modulating light signal of said initial radiation according to a communication signal supplied by the first communication means, said modulating light signal being designed to be received by light signal receiver means sensitive to the initial radiation.

In a preferred embodiment, the lighting device comprises receiver means comprising a sensor sensitive to the initial radiation connected to receipt signal processing means.

Advantageously, the receiver means comprise optical filtering means to let a light signal corresponding to an initial radiation pass and to reject a secondary radiation.

Preferably, the receiver means comprise electronic filtering means to reduce or eliminate a DC component of a signal representative of an optical signal received by the receiver means.

Preferably, the electronic control means control power supply of at least one light-emitting diode light emitter to emit a modulated light signal of said initial radiation by superposing a DC component and a modulation signal representative of a communication signal.

Advantageously, the DC component depends on a value representative of the communication signal.

Advantageously, the amplitude of the modulation signal depends on a value representative of the communication signal.

Advantageously, the electronic control means comprise compensation means to compensate lighting color drifts.

In a particular embodiment, the lighting device comprises at least one red light-emitting diode light emitter and/or at least one blue light-emitting diode light emitter controlled by the electronic control means.

Preferably, the electronic control means comprise means for controlling the color temperature of the light.

Advantageously, the lighting device comprises at least one light sensor connected to the control means to regulate the light intensity, the color rendering index and/or the color temperature of a light intended for lighting.

Advantageously, the lighting device comprises at least one current sensor to supply to the control means a signal representative of a current flowing in at least one emitter and to regulate a current to be supplied to said emitter.

A lighting installation according to an embodiment of the invention comprises an electric power supply line to supply at least one lighting device as defined above and at least one electrical apparatus connected to a receiver comprising a sensor sensitive to the initial radiation.

Advantageously, said receiver is integrated in said at least one electrical apparatus.

BRIEF DESCRIPTION OF THE DRAWINGS

Other advantages and features will become more clearly apparent from the following description of particular embodiments of the invention, given as non-restrictive examples only and represented in the accompanying drawings, in which.

DETAILED DESCRIPTION OF PREFERRED EMBODIMENTS

Figure 1:
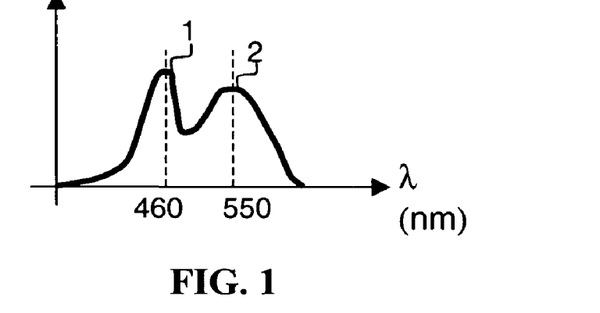
FIG. 1 represents a light spectrum able to be emitted by a white light-emitting diode emitter.

FIG. 1 shows a light spectrum able to be emitted by a white light light-emitting diode usable in a device according to the invention. In such a diode, a first radiation is emitted in the blue or the ultraviolet, for example centered on a wavelength of 460 nanometers. A second radiation is re-emitted by a fluorescent layer in particular made of phosphor excited by the first radiation. The second radiation is for example in the greens or yellows, for example centered on 550 nanometers. Mixing these two radiations produces a white light usable for lighting.

Figure 2:
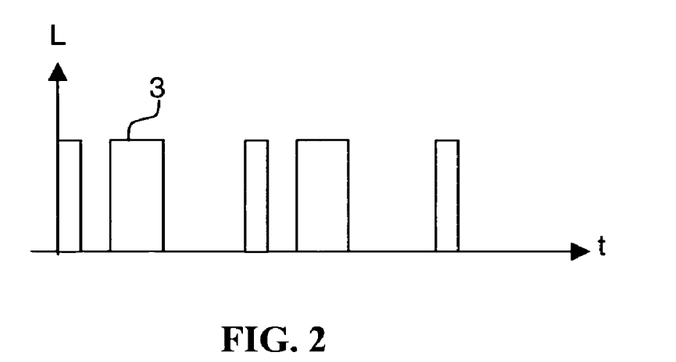
FIG. 2 represents an example of communication signals.

FIG. 2 shows an example of a communication signal frame able to modulate a first radiation emitted by the white light-emitting diodes. The first radiation 1 has a fast response time and enables data to be transmitted with a fast transmission rate.

Figure 3:
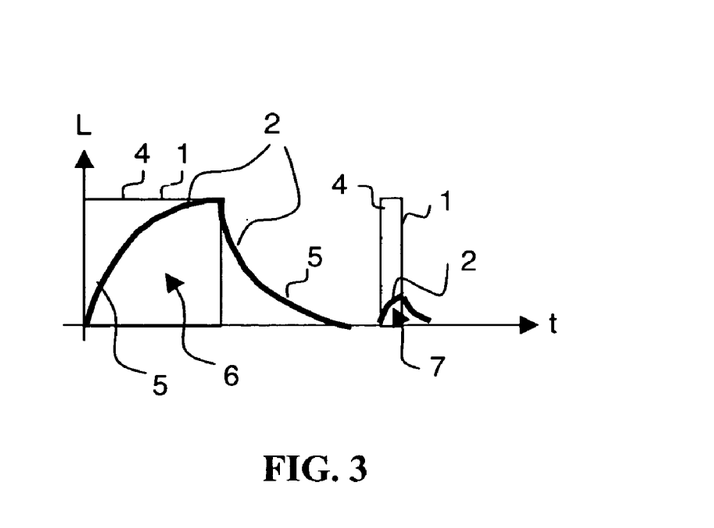
FIG. 3 illustrates the aspect of the light intensity of a first and a second radiation controlled by a signal representative of a communication signal.

In FIG. 3, a first radiation 1 represented by a curve 4 has a fast response and a second radiation represented by a curve 5 follows the first radiation with a slower response. If a communication signal 3 varies little as in a first part 6 of FIG. 3, the second radiation 2 can reach a sufficient value and not impair the white light too much. In the case where the variation is fast, as in the second part 7 of the curves of FIG. 3, the first radiation is at its maximum value but the second radiation cannot reach its normal lighting value. In the part 7, the brightness of the device decreases and the color rendering becomes poor because a component of the white light decreases greatly. Moreover, the slow reaction of the second radiation is liable to disturb radiation sensors designed to receive optical communication signals.

Figure 4:
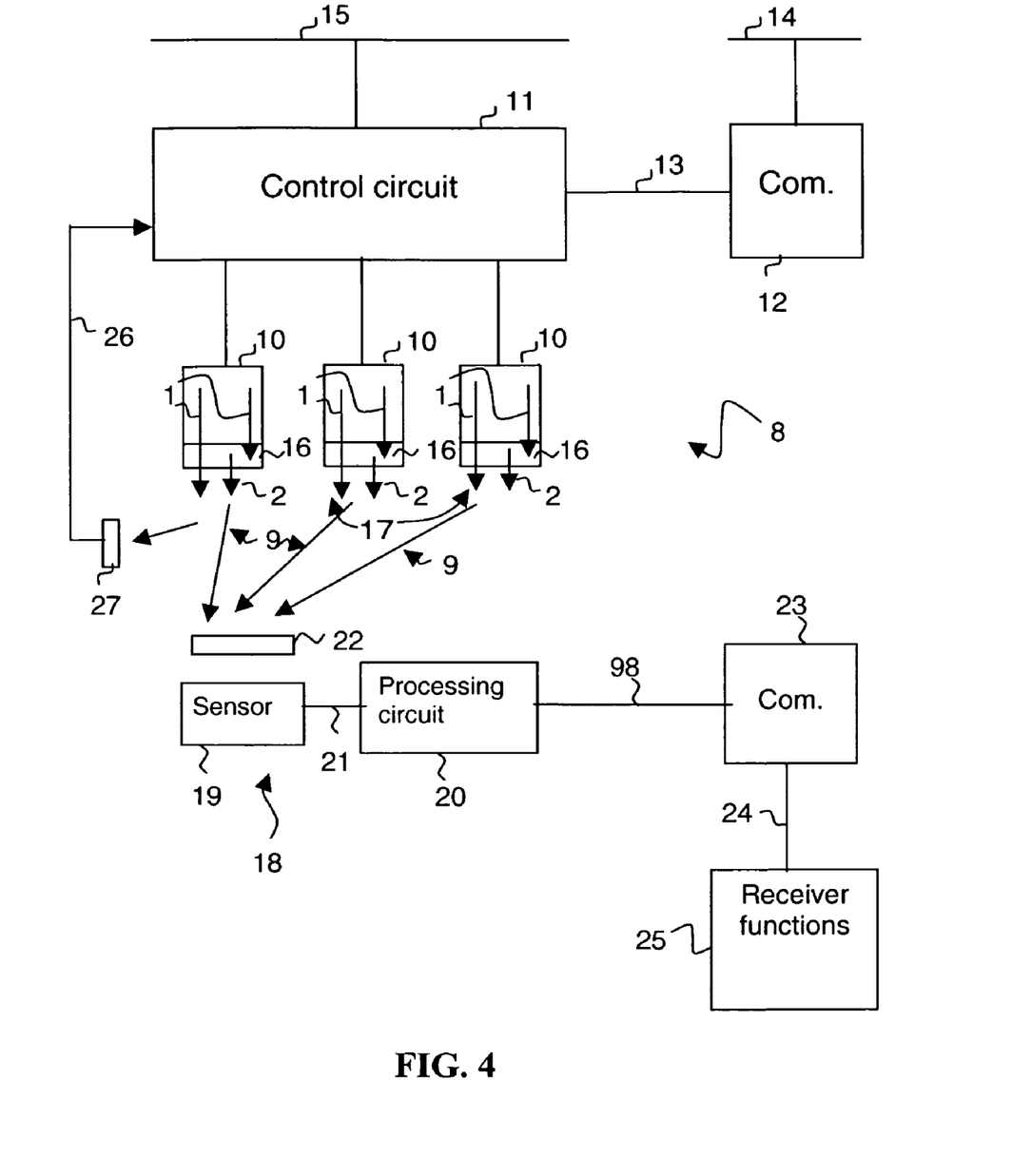
FIG. 4 represents a lighting device according to an embodiment of the invention.

In a lighting device 8 according to an embodiment of the invention represented in FIG. 4, light-emitting diode light emitters 10 designed to emit white light 9 are connected to an electronic control circuit 11. A communication circuit 12 is connected to the control circuit to supply communication signals 13 and to a communication line 14 to receive signals to be transmitted. The electronic control circuit 11 is connected to a power supply line 15 to receive electric power. When they are supplied by the control circuit, the light emitters 10 produce an initial radiation 1 and a secondary radiation 2 resulting from excitation of at least one layer 16 of material reacting to said initial radiation. The control circuit thus controls the lighting and commands power supply of the light-emitting diode light emitters 10 to emit a modulating light signal 17 of said initial radiation 1 according to a communication signal 13 supplied by the first communication means 12. Said modulating light signal 17 is designed to be received by a light signal receiver 18 sensitive to the initial radiation 1.

The receiver 18 comprises a sensor 19 sensitive to the initial radiation connected to a processing circuit 20 to process receipt signals 21. An optical filter 22 is arranged in front of the sensor 19 to let a light signal corresponding to an initial radiation 1 pass and to reject a secondary radiation 2.

Advantageously, the processing circuit 20 comprises an electronic filter 28 to reduce or eliminate a DC component of a signal representative of an optical signal received by the receiver sensor 19. An output signal 98 of the processing circuit is supplied to a communication circuit 23 of the receiver which in turn supplies signals 24 usable by a functions module 25 of the receiver.

The control circuit 11 preferably comprises an input to receive signals 26 supplied by a light sensor 27. Thus, the circuit 11 can regulate in dynamic manner the light intensity, the color rendering and the color temperature according to the light received by the sensor. Such a regulation enables the light produced but also the ambient light which may exist in a lighted room to be taken into account. This sensor can be of the photodiode or color sensor type. In this case, the signal 26 will comprise three signals representative of three colors, for example red, green and blue.

Figure 5A:
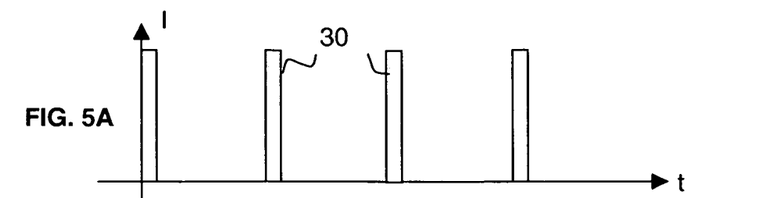
FIGS. 5A, 5B and 5C represent signals in a lighting device according to an embodiment of the invention without compensation.
Figure 5B:
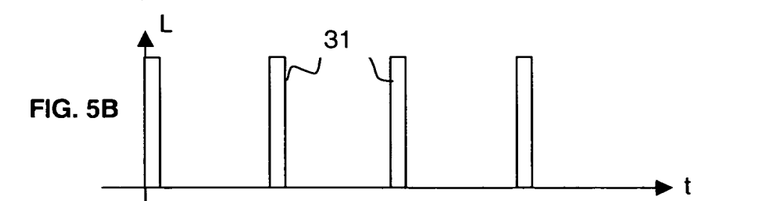
Figure 5C:
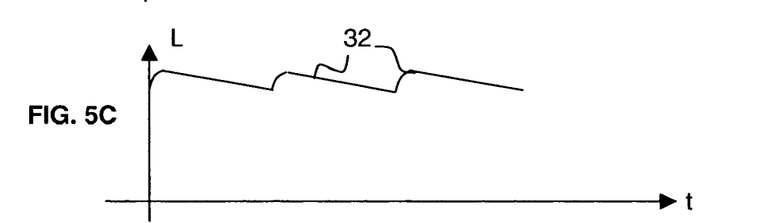

FIGS. 5A to 5C show signals in a non-compensated device. A curve 30 of FIG. 5A illustrates a communication signal 13, a curve 31 of FIG. 5B illustrates an optical signal produced by the initial radiation 1 and a curve 32 illustrates the aspect of a secondary radiation 2. The initial radiation 1 will be received and used for communication. The secondary radiation is used in combination with the initial radiation to produce white light. In the case of FIGS. 5A to 5C, communication is performed rapidly but the color rendering may still be disturbed.

In an advantageous embodiment, the control circuit 11 controls the light-emitting diode light emitters 10 to emit a light signal of said initial radiation by superposing a DC component and a modulation signal representative of a communication signal.

Figure 6A:
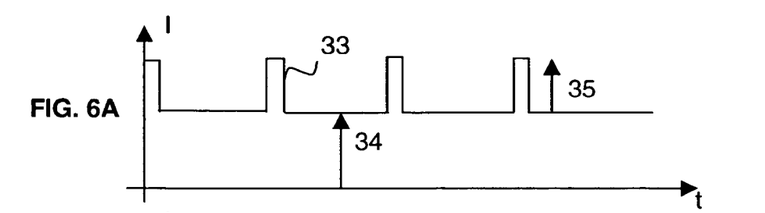
FIGS. 6A, 6B and 6C represent signals in a lighting device according to an embodiment of the invention with compensation.
Figure 6B:
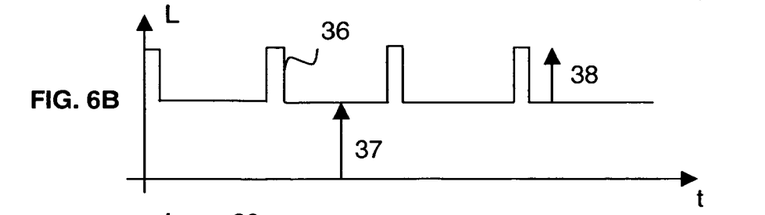
Figure 6C:
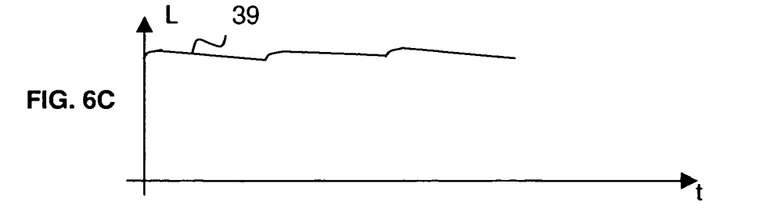

FIGS. 6A to 6C show signals of a compensated device. A curve 33 of FIG. 6A illustrates a communication or control signal 13 comprising a DC component 34 and a modulated part 35, a curve 36 of FIG. 6B illustrates an optical signal produced by the initial radiation 1 with a DC part 37 and a variable part 38, and a curve 39 illustrates the aspect of a secondary radiation 2. The secondary radiation is much less disturbed and regulation can be performed more easily by varying the value of the DC component 34 or 37. Thus, the brightness, color rendering and color temperature are very stable and very little dependent on the communication signal.

Figure 7:
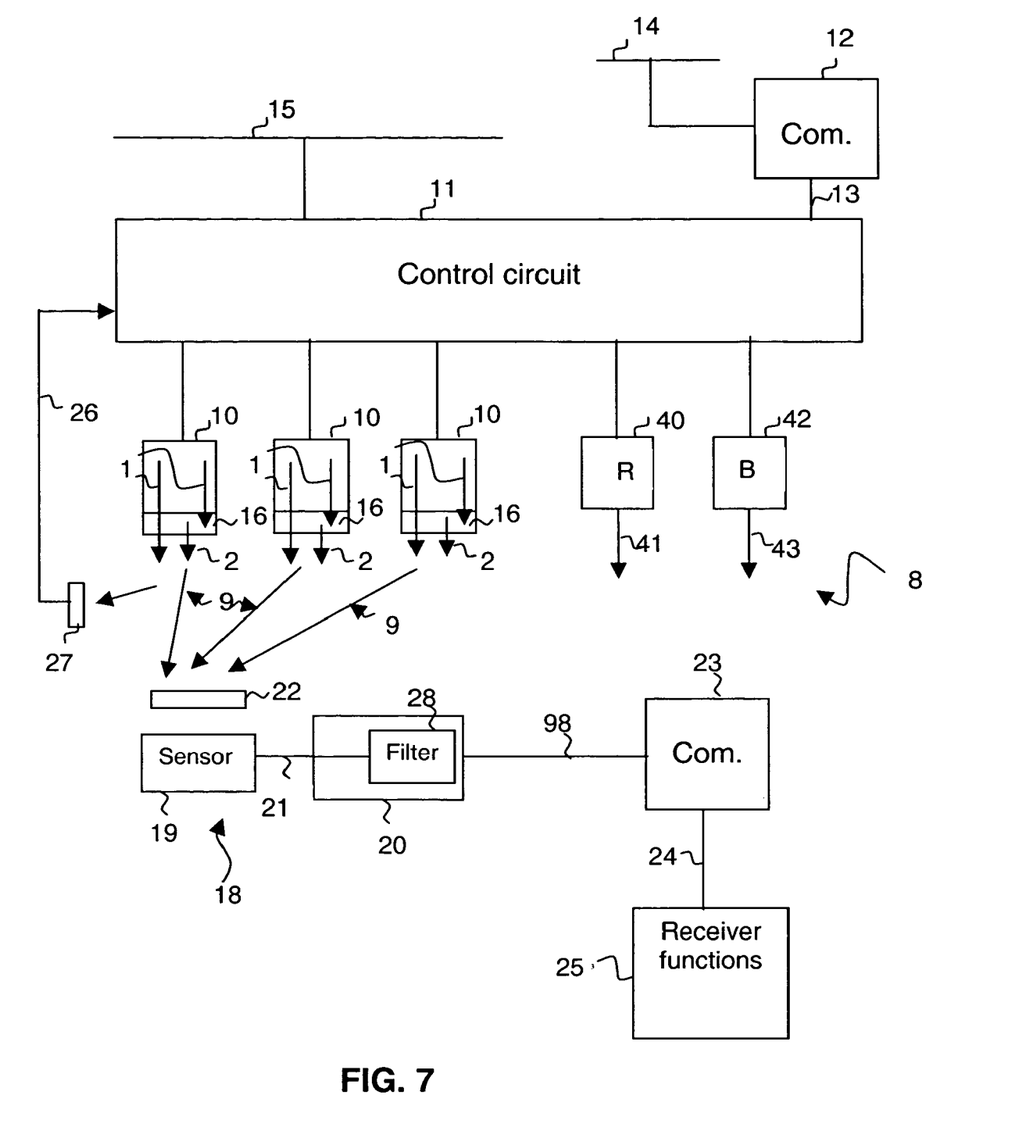
FIG. 7 represents a lighting device according to an embodiment of the invention also comprising diodes emitting colored lights.

To improve control of the color rendering and color temperature, a device according to an embodiment of the invention, represented in FIG. 7, comprises light-emitting diode emitters 40 of red light 41 and light-emitting diode emitters 42 of blue light 43 controlled by the control circuit 11.

Figure 8:
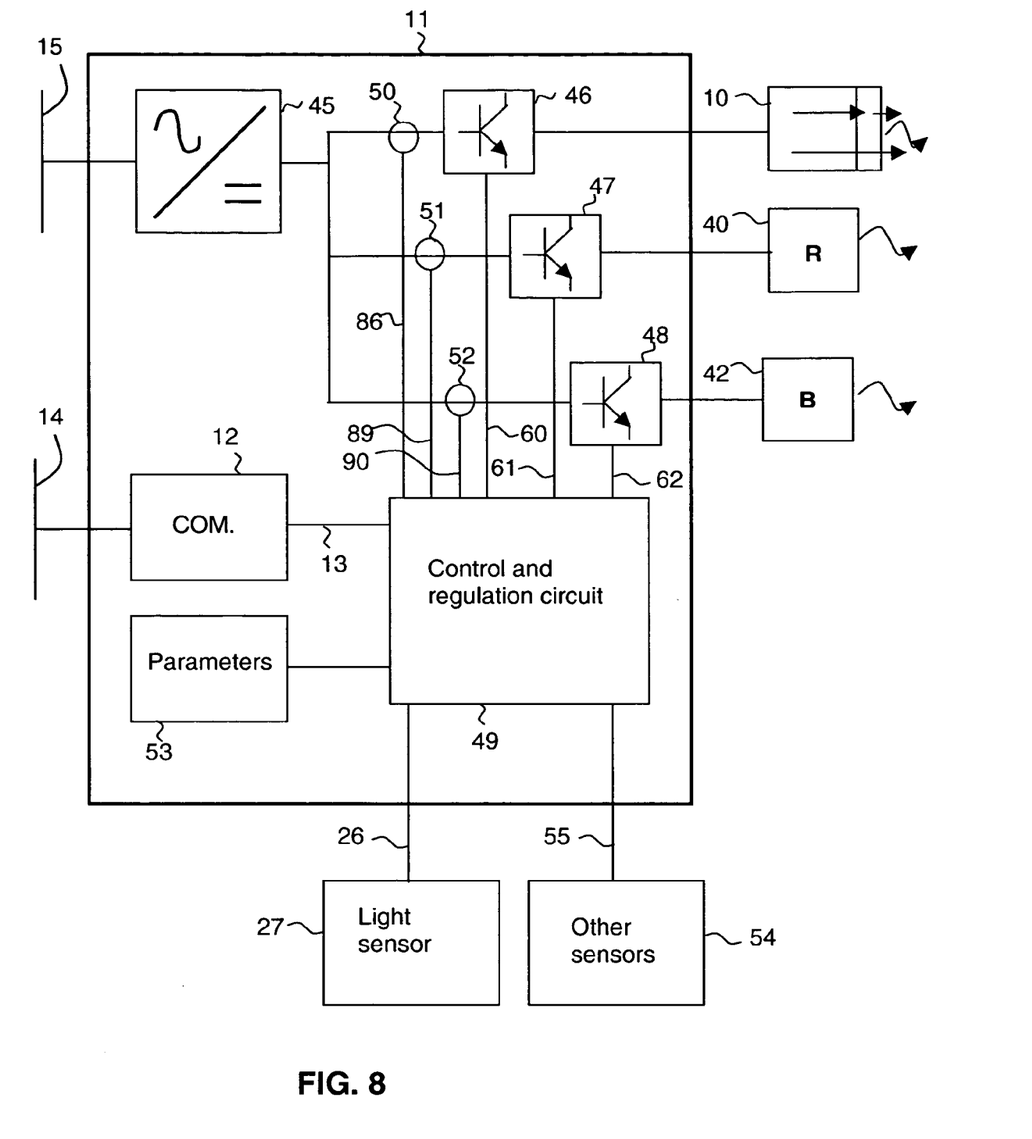
FIG. 8 represents a diagram of a control circuit of a lighting device according to an embodiment of the invention.

FIG. 8 represents a block diagram of a control circuit 11. In this diagram, a power supply circuit connected to the line 15 supplies the light emitters 10, 40 and 42 via electronic power circuits respectively 46, 47 and 48.

A control and regulation circuit 49 receives communication signals 13 and commands the electronic power circuits according to values representative of said signals. Current sensors 50, 51 and 52 supply the circuit 49 with signals representative of currents flowing in the light emitters respectively 10, 40 and 42. Control and regulation are preferably performed according to parameters 53 supplied to the circuit 49. For example the parameters can be recorded in a memory circuit.

A light sensor 27 is connected to the circuit 49 to enable efficient regulation of the light intensity, of the color rendering index and/or of the color temperature. Other sensors 54 can supply control signals 55 to the circuit 49. For example, the sensor 54 can be a presence detector enabling the lighting device to be switched on or switched off depending on the presence or not of a person in a detection zone. The arrangement of the sensor can depend on the use, for example the sensor can be arranged near to the lighting device or be located remotely in a more suitable place. The sensor can also be arranged on a work table or on a desk. It will then be advantageously linked to the control device by a wireless link, in particular by a radio or infrared link.

Control signals 60, 61 and 62 applied by the circuit 49 to the electronic power circuits respectively 46, 47 and 48 can thus depend on several signals or events.

Figure 9:
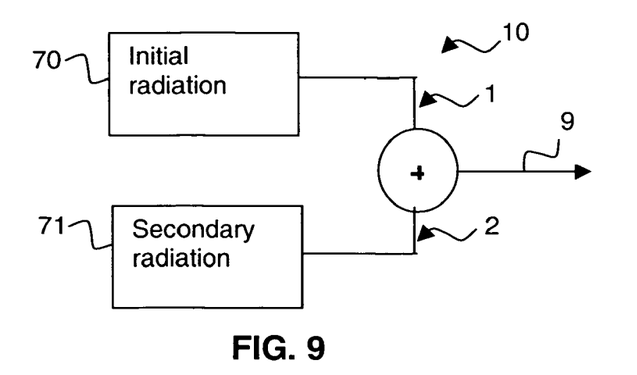
FIG. 9 represents a modelling diagram of the functions of a diode emitting white light.

The diagram of FIG. 9 shows a functional modelling of a light-emitting diode emitting white light. A block 70 represents the generator of the initial radiation 1 output from the optical emitter and a block 71 represents a generator of secondary radiation 2 produced by a fluorescent layer of phosphors. The resulting white light 9 is the combination of the radiations 1 and 2.

Figure 10:
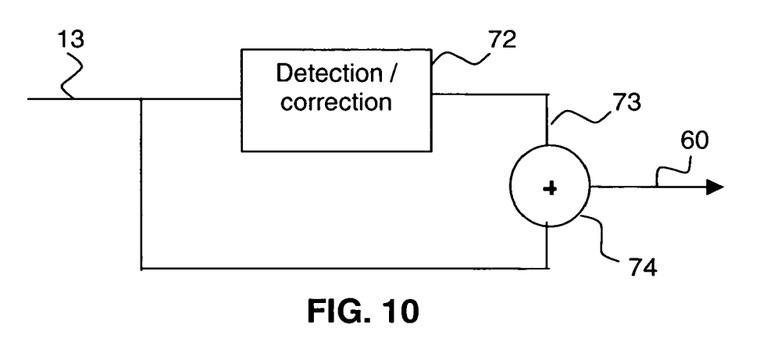
FIG. 10 represents a first compensation diagram of a lighting device according to an embodiment of the invention.

In a compensation device, the value of the DC component is adjusted to keep substantially constant light characteristics. FIG. 10 shows a regulation system enabling a control signal 60 to be supplied to white light emitters clamped to a signal 13 representative of a communication signal. Thus, a detection and correction module 72 receives the signal 13 and supplies a DC component signal 73 to an operator 74. Said operator 74 combines the signal 13 and the signal 73 to supply the control signal 60 controlling the circuit 46. The DC component 73 can be determined notably according to the mean value, the rms value, the frequency and/or the duty cycle of the signal 13.

Figure 11:
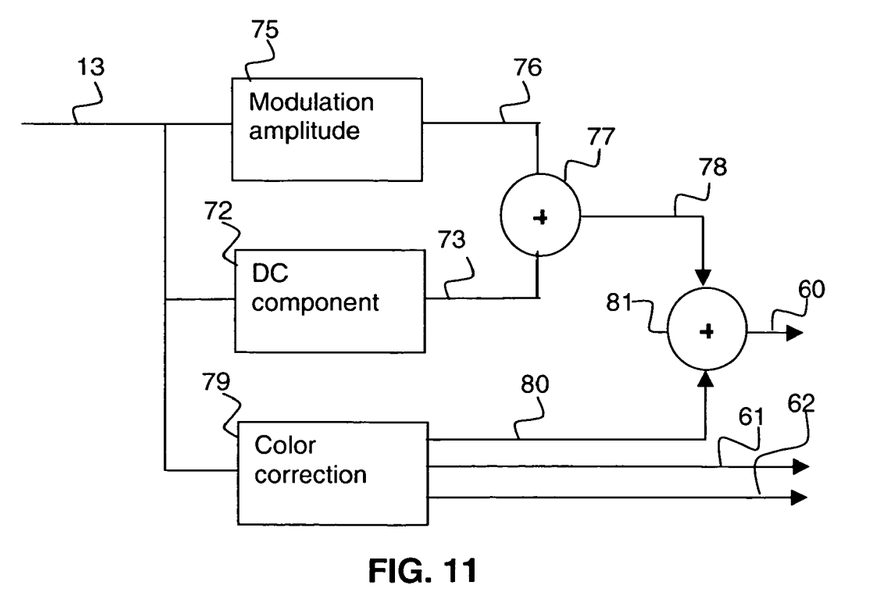
FIG. 11 represents a second compensation diagram of a lighting device according to an embodiment of the invention.

In a regulation system represented in FIG. 11, a module 72 performs correction of the DC component by supplying a signal 73, and a module 75 receiving the signal 13 performs correction of the amplitude of the variable signal by supplying a modulation signal 76 the amplitude whereof varies according to the input signal 13. The signals 73 and 76 are applied to an operator 77 which supplies a signal 78 comprising a DC component and a variable communication signal corrected according to the input signal 13. The signal 78 can be applied to the circuit 46 as control signal 60. However, correction can be completed by a color correction module 79 receiving the signal 13 and supplying a signal 80 to correct the color rendering and/or the color temperature. The signal 80 is combined with the signal 78 in an operator 81 to supply the control signal 60. The module 79 can also control blue or red light diodes by supplying control signals 61 and 62.

Figure 12:
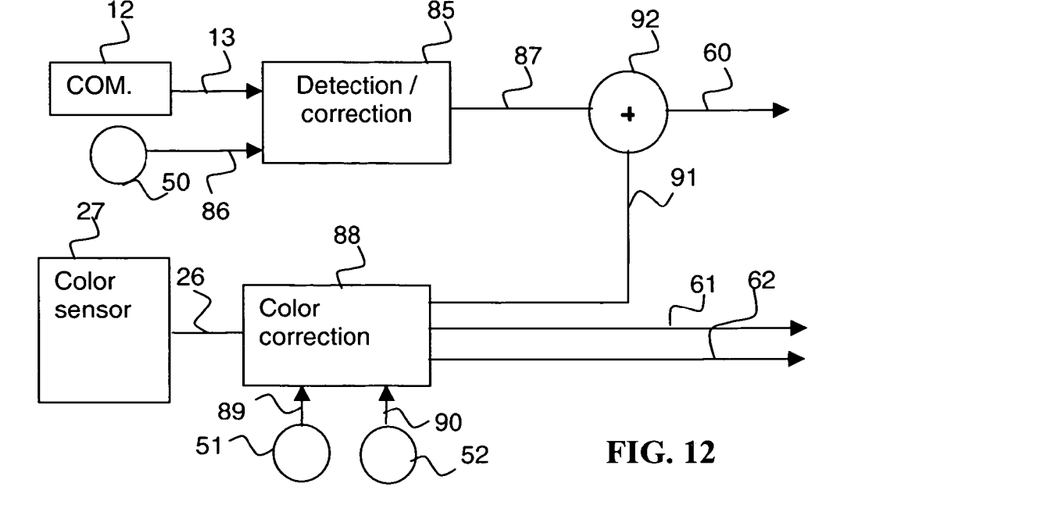
FIG. 12 represents a regulation diagram of a lighting device according to an embodiment of the invention.

FIG. 12 shows a regulation system also performing regulation according to currents flowing in the light emitters. Thus, a regulation module 85 receives a communication signal 13 and a signal 86 representative of a current flowing in white light light-emitting diodes supplied by the sensor 50. The module 85 performs regulation and supplies a signal 87 containing a DC component and a variable part dependent on the signal 13 and on the current signal 86. A color correction module 88 receives a signal 26 from a light or color sensor 27 and signals 89 and 90 supplied by the current sensors respectively 51 and 52. The module 88 performs color correction according to the signals 26, 89 and 90 and supplies a correction signal 91 to correct control of the white light emitters and signals 61 and 62 to control the red and blue light emitters. An operator 92 combines the signals 87 and 91 to supply a control signal 60 of the white light emitters. Advantageously, such a device achieves a very efficient compensation of the light intensity, of the color rendering index and of the color temperature.

Figure 13:
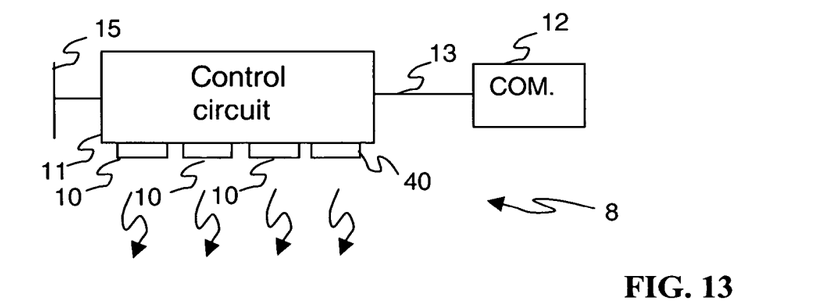
FIG. 13 represents an installation comprising an apparatus and a device according to an embodiment of the invention.

FIG. 13 shows an installation comprising a lighting device 8 according to an embodiment of the invention connected to an electric power supply line 15 and to an electric apparatus 95 connected to a receiver 18 comprising a sensor sensitive to the initial radiation 1. Said receiver 18 can also be integrated in a receiver 96 to receive communication light signals.

The electric apparatuses can be in particular computers, multimedia equipment, or portable equipment, in particular video or sound equipment.

Figure 14:
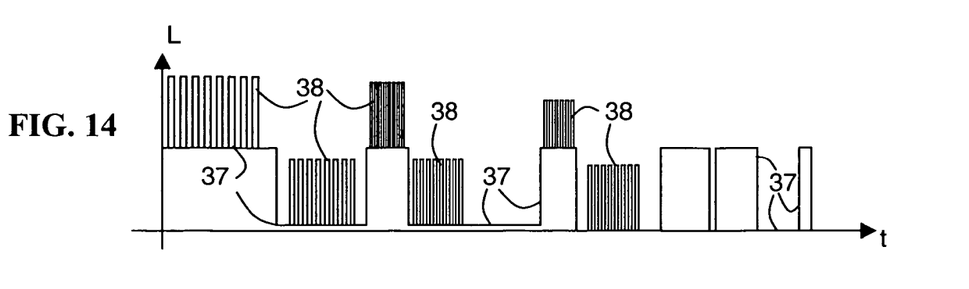
FIG. 14 represents signals able to be emitted by a device according to an embodiment of the invention.

FIG. 14 shows signals also able to be used in lighting devices where the variation and adjustment of the brightness are performed by pulse width modulation or by variation of the diode lighting cycle. Thus, the DC component 37 can be modulated at low frequency to control the lighting intensity and the variable component 38 representative of the communication signal to be emitted by radiation is superposed on the signal 37.

In the devices described above, the light emitters are represented operating in direct lighting. However, they can advantageously comprise an optical light or color distribution, diffusion and/or mixing device to improve the quality of the light. Furthermore, the light emitters can be numerous and be arranged in the form of a matrix and/or be constituted by high power emitters arranged at the periphery of a distribution device.

The invention claimed is:

1. A lighting device comprising:
   at least one light-emitting diode for emitting white light by producing an initial radiation and a secondary radiation resulting from excitation of at least one layer of material which reacts to said initial radiation;
   an electronic controller for controlling the lighting connected to said at least one light-emitting diode;
   at least one communication means for transmitting data connected to said electronic controller; and
   a light signal receiver sensitive to the initial radiation and able to receive a modulating light signal from said at least one light-emitting diode;
   wherein the electronic controller controls a power supply of at least one light-emitting diode, said at least one light-emitting diode for emitting a modulating light signal of said initial radiation according to a communication signal transmitted by the at least one communication means.

2. A lighting device according to claim 1 comprising a receiver comprising a sensor sensitive to the initial radiation connected to a receipt signal processor.

3. A lighting device according to claim 2 wherein the receiver comprises an optical filtering means to let a light signal corresponding to an initial radiation pass and to reject a secondary radiation.

4. A lighting device according to claim 2 wherein the receiver comprises at least one electronic filter to reduce or eliminate a DC component of a signal representative of an optical signal received by the receiver.

5. A lighting device according to claim 1 wherein the electronic controller controls a power supply of at least one light-emitting diode for emitting a modulated light signal of said initial radiation by superposing a DC component and a modulation signal representative of a communication signal.

6. A lighting device according to claim 5 wherein the DC component depends on a value representative of the communication signal.

7. A lighting device according to claim 5 wherein the amplitude of the modulation signal depends on a value representative of the communication signal.

8. A lighting device according to claim 7 wherein the electronic controller comprises a means for compensating lighting color drifts.

9. A lighting device according to claim 1 comprising at least one red light-emitting diode and/or at least one blue light-emitting diode controlled by the electronic controller.

10. A lighting device according to claim 1 wherein the electronic controller comprises a light color temperature controller.

11. A lighting device according to claim 1 comprising at least one light sensor connected to the electronic controller for regulating at least one of the light intensity, the color rendering index and/or the color temperature of a light intended for lighting.

12. A lighting device according to claim 1 comprising at least one current sensor for supplying to the electronic controller a signal representative of a current flowing in at least one emitter, to regulate a current to be supplied to said emitter.

13. A lighting installation comprising an electric power supply line for supplying at least one lighting device comprising at least one lighting device according to claim 1 and at least one electrical apparatus connected to a receiver comprising a sensor sensitive to the initial radiation.

14. A lighting installation according to claim 13 wherein said receiver is integrated in said at least one electrical apparatus.

* * * * *